United States Patent [19]

Ezekoye

[11] Patent Number: 4,646,782

[45] Date of Patent: Mar. 3, 1987

[54] SURGE SUPPRESSING CHECK VALVE

[75] Inventor: L. Ike Ezekoye, Wilkinsburg, Pa.

[73] Assignee: Westinghouse Electric Corp., Pittsburgh, Pa.

[21] Appl. No.: 663,532

[22] Filed: Oct. 22, 1984

[51] Int. Cl.4 .................. F16K 17/12; F16L 55/04
[52] U.S. Cl. ................... 137/527.8; 138/31; 417/540
[58] Field of Search ........ 137/511, 527, 527.8, 137/568, 207; 138/31; 417/540, 542, 543, 544

[56] References Cited

U.S. PATENT DOCUMENTS

| | | | |
|---|---|---|---|
| 941,587 | 11/1909 | Putnam | 138/31 X |
| 1,244,271 | 10/1917 | Witter | 138/31 |
| 1,536,531 | 5/1925 | Schermann | 138/31 |
| 1,553,768 | 9/1925 | Gleason | 417/543 |
| 1,663,647 | 3/1928 | Brush | 138/31 X |
| 1,779,448 | 10/1930 | Pomeroy | 138/31 |
| 1,910,345 | 5/1933 | Levitt et al. | 138/31 |
| 2,216,374 | 10/1940 | Martin | 417/540 |
| 2,655,937 | 10/1953 | Harris | 417/540 |
| 2,912,937 | 11/1959 | Insley | 417/540 |
| 2,934,025 | 4/1960 | Wilson | 138/31 |
| 3,168,045 | 2/1965 | Sebastiani | 138/31 X |
| 3,177,894 | 4/1965 | Camp | 137/514 |
| 3,192,864 | 7/1965 | Notte | 417/540 |
| 3,288,166 | 11/1966 | Wagner | 137/568 |
| 3,487,855 | 1/1970 | Lautenberger, Jr. | 138/31 |
| 3,817,278 | 6/1974 | Elliott | 137/527 |
| 4,000,758 | 1/1977 | Meisenheimer, Jr. | 138/31 |
| 4,463,603 | 8/1984 | Welker | 138/31 |

OTHER PUBLICATIONS

"Nuclear Containment of Postulated Feedwater Linebreak", E. B. Pool et al., Flow Line Magazine, Flow Control Division, Rockwell International, 1978.

"A Model for Check Valve/Feedwater System Waterhammer Analysis", M. J. Kirik et al., ASME Conference, 1980.

"Valves Powered by Line Pressure", W. R. Pierce, Building Systems Design, Jun. 1970, pp. 33–36.

*Primary Examiner*—Alan Cohan
*Assistant Examiner*—John A. Rivell
*Attorney, Agent, or Firm*—L. A. DePaul

[57] ABSTRACT

A surge suppressing check valve, in its closed condition, closes a fluid passage and separates it into inlet and outlet portions. A cylinder communicates with the outlet portion. A first piston closes the cylinder adjacent to the outlet portion and is axially movable against the urging of a compression spring to enlarge the volume of the outlet portion of the fluid passage for suppressing pressure surges therein. A second piston is provided for pre-loading the bias spring, the pre-loading being selectively variable via a threaded stem and nut connected to the second piston. The first and second pistons are coupled together so that the entire assembly can be removed from the housing. Means are provided for removing fluid from the housing.

10 Claims, 5 Drawing Figures

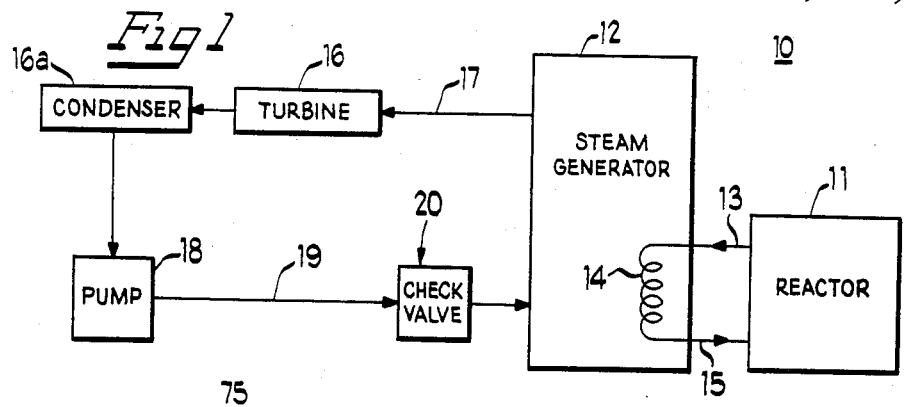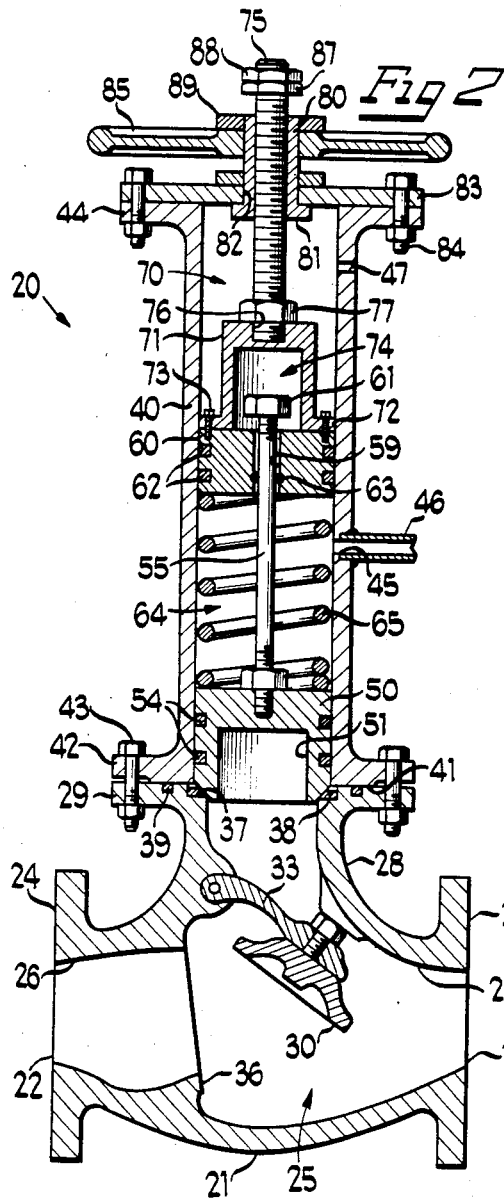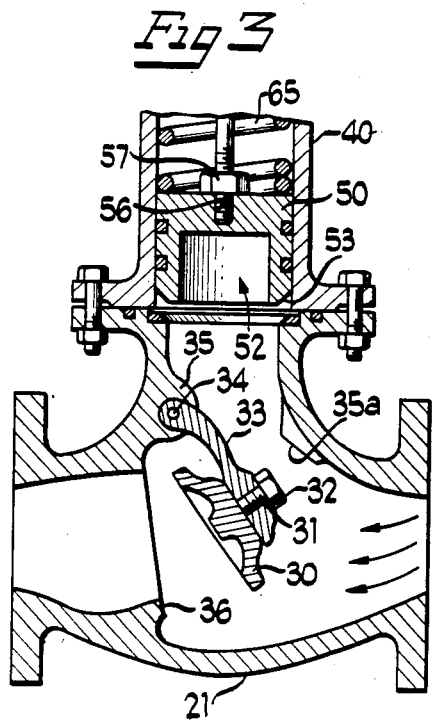

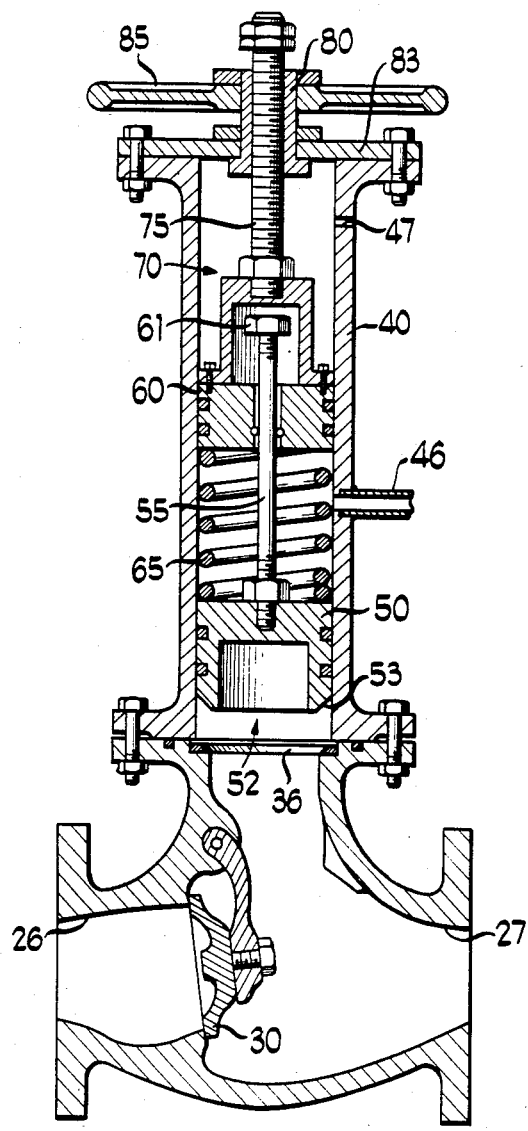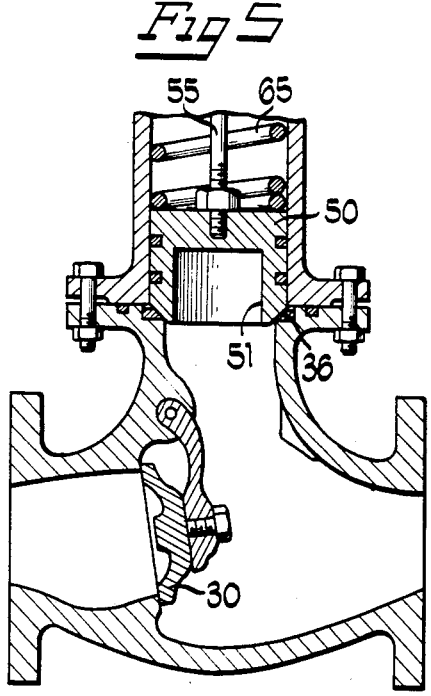

SURGE SUPPRESSING CHECK VALVE

BACKGROUND OF THE INVENTION

1. Field of the Invention

The present invention relates to check valves of the type which automatically close in response to a flow reversal in a liquid flow passage. The invention relates particularly to means for suppressing pressure surges which occur in the flow passage as a result of sudden closure of the check valve. While the present invention has application to various types of check valves for any desired application, the invention is described in connection with check valves of the type utilized in nuclear steam generator plants.

2. Description of the Prior Art

In a typical nuclear steam generating plant, the cooling water for a nuclear reactor is circulated through a steam generator, wherein the water from the nuclear reactor is circulated in heat-exchange relationship with respect to a secondary feedwater. The feedwater is heated and converted to steam, which is then directed through an associated steam turbine to a condenser where the steam is converted back to water, the condensate being pumped back to the steam generator as the feedwater. The discharge from several of the steam generators may be coupled between the steam generators and the associated steam turbine in a manifolded arrangement. Typically, the turbine, the condenser and the associated pumping equipment are located some distance from the steam generators. In the event of an earthquake or other severe shock, the long extent of conduit between the pumping equipment and the steam generator may be susceptible to damage or rupture. Accordingly, a check valve is typically provided in this conduit adjacent to the steam generator. In the event of a break in the conduit upstream of this check valve, the sudden drop in pressure at the break would create a large pressure differential which would result in the pressurized feedwater in the steam generator flowing in the reverse direction through the check valve toward the break. The check valve responds to this reverse flow by immediately closing.

One difficulty with prior check valves is that upon sudden closure they generate a pressure surge or "water hammer" effect which is reflected back and forth between the steam generator and the check valve. This pressure surge can be as great as six times the normal line pressure, which is typically about 1,300 psi. These very high pressure surges can damage the steam generator tubes or instruments in the line.

It is known that providing damping on the check valve minimizes the "water hammer" effect. In other words, the closure of the check valve is slowed down to prevent it from slamming shut. This technique works quite well in alleviating the pressure surge, but it necessarily results in a much greater loss of feedwater from the steam generator through the break, since the valve is open longer. This can be a serious drawback in nuclear steam generator applications, since the feedwater in the steam generator serves as a coolant for the reactor cooling water and substantial loss of this coolant can result in increased heating of the reactor core. While the steam generator is typically provided with alternative feed lines, designed to supply feedwater in the event of a break in the main feed line, these alternate lines are of much smaller diameter and, therefore, cannot make up lost steam generator feedwater very rapidly.

SUMMARY OF THE INVENTION

It is a general object of the present invention to provide an improved check valve which avoids the disadvantages of prior art valves while affording additional structural and operating advantages.

An important object of the invention is the provision of a check valve which suppresses pressure surges, while at the same time permitting rapid closure of the valve.

It is another object of the invention to provide a check valve of the type set forth, which is of relatively simple and economical construction.

Still another object of the invention is the provision of a check valve of the type set forth, which is adjustable for selectively varying the line pressure at which the surge suppression feature comes into play.

Yet another object of the invention is the provision of a check valve of the type set forth, which affords easy disassembly.

These and other objects of the invention are attained by providing, in a check valve movable between an open condition opening a fluid passage and a closed condition closing the fluid passage and dividing it into inlet and outlet portions, the improvement comprising: variable-volume chamber means communicating with the outlet portion of the fluid passage and responsive to a predetermined pressure therein for increasing the volume of said chamber means, thereby to increase the effective volume of the outlet portion of the fluid passage for suppressing pressure surges therein.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a block diagram of a nuclear steam generating plant incorporating a check valve constructed in accordance with and embodying the features of the present invention;

FIG. 2 is a view in vertical section through the check valve of the present invention, in its normal-flow open condition;

FIG. 3 is a fragmentary sectional view, similar to FIG. 2, of the check valve in a reverse flow condition, with the valve member partially closed;

FIG. 4 is a view similar to FIG. 2, showing the check valve at the moment of closure; and FIG. 5 is a view similar to FIG. 3, illustrating the closed check valve after the line pressure has returned to equilibrium.

DESCRIPTION OF THE PREFERRED EMBODIMENT

Referring to FIG. 1, there is diagrammatically illustrated a nuclear steam generating plant, generally designated by the numeral 10, including a nuclear reactor 11 connected with a steam generator 12 in standard fashion. More specifically, cooling water from the reactor core is circulated through a conduit 13 to the steam generator 12, where it passes through heat-transfer tubes 14 and thence back to the nuclear reactor 11 via a conduit 15. Secondary feedwater is circulated around the tubes 14 in heat-exchange relationship therewith, the feedwater being converted to steam and circulated to an associated steam turbine 16 and condenser 16a, via a conduit 17, and thence through a pump 18 and a conduit 19 back to the steam generator 12. A check valve 20, in accordance with the present invention, is disposed in the conduit 19 closely adjacent to the steam generator 12. While only one steam generator 12 has been shown for purposes of illustration, it will be appreciated that in practice a number of steam generators 12 may be connected in manifolded arrangement between the nuclear reactor 11 and the steam turbine 16, each of the steam generators 12 being provided with a check valve 20. Typically, the steam generator 12 is disposed closely adjacent to the nuclear reactor 11, but at a considerable distance from the turbine 16. Accordingly, the conduit 19 may be 200 or 300 feet in length and, therefore, susceptible to damage from severe shocks, such as might be caused by an earthquake.

Referring now also to FIGS. 2 through 5 of the drawings, the check valve 20 includes a unitary body 21 having an inlet port 22 and an outlet port 23, each provided with an attachment flange 24 for securing the check valve 20 to associated sections of the conduit 19. The body 21 defines a fluid passage 25 therethrough extending between the inlet and outlet ports 22 and 23 for communication with the conduit 19, the passage 25 including an inlet cavity 26 and an outlet cavity 27. The body 21 is also provided with a hollow neck portion 28 which communicates with the outlet cavity 27 and is provided with an annular attachment flange 29.

A valve disk 30 is disposed within the body 21 and is provided with a lug 31 which is received through a complementary opening in one end of an arm 33, being secured thereto by a nut 32. The other end of the arm 33 is pivotally mounted, as by a pivot pin 34, to a projection 35 in the neck portion 28 of the body 21. Thus, it will be appreciated that the valve disk 30 is adapted for pivotal movement between an open condition, illustrated in FIG. 2, with the lug 31 in engagement with a stop 35a for permitting free flow of fluid through the passage 25 in a normal forward flow direction, indicated by the arrows in FIG. 2, and a closed condition, illustrated in FIGS. 4 and 5, with the valve disk 30 in engagement with an annular seat 36 around the entire circumference thereof for closing the passage 25 and separating the inlet cavity 26 from the outlet cavity 27. It will be appreciated that, in normal operation, the forward flow established by the pump 18 will hold the valve disk 30 in its open condition.

The neck portion 28 is provided at its outer end with an annular recess 37 in which is disposed an annular seat 38, which may be formed of a hardened metal alloy. Also disposed in a complementary annular groove in the flange 29 is a suitable gasket 39 to provide a seal with a cylindrical expansion housing 40 which is mounted on the neck portion 28. More specifically, the housing 40 has an annular end face 41 disposed in sealing engagement with the gasket 39, the housing 40 also being provided with an annular mounting flange 42 which is fixedly secured to the flange 29, as by bolts 43. The housing 40 is also provided at its other end with an annular attachment flange 44, for a purpose to be explained below. The housing 40 is disposed with the longitudinal axis thereof substantially perpendicular to the axis of the passage 25, and will typically be oriented vertically in use. The housing 40 is provided with a port 45 in the side thereof, coupled by a conduit 46 to associated recovery apparatus (not shown). The housing 40 is also provided adjacent to the upper end thereof with a vent port 47, for a purpose which will be explained below.

Disposed within the housing 40 adjacent to its lower end is a cylindrical accumulator piston 50 having a cylindrical axial cavity 51 in the lower end thereof defining a chamber 52 which communicates with the outlet cavity 27 in the body 21. The outer cylindrical surface of the piston 50 is chamfered at its lower end, as at 53, for flush seating engagement with the seat 38. The piston 50 is disposed for sliding movement axially of the housing 40, being provided with a pair of axially spaced-apart circumferential seals 54 which are respectively seated in corresponding circumferential grooves in the outer surface of the piston 50 for sealing engagement with the inner surface of the housing 40. Secured to the piston 50 and extending upwardly therefrom coaxially with the housing 40 is an elongated rod 55. More specifically, the rod 55 may be threaded at its lower end for threaded engagement in a bore 56 in the upper surface of the piston 50, being locked in place thereon by a nut 57. However, it will be appreciated that other means of attachment of the rod 55 to the piston 50 could be used.

The upper end of the rod 55 extends through an axial cylindrical bore 59 in a cylindrical compression piston 60 which is also disposed for axial sliding movement within the housing 40. Threadedly engaged with the upper end of the rod 55 above the compression piston 60 is a nut 61 having a diameter greater than that of the bore 59. The piston 60 is provided with a pair of axially spaced-apart circumferential seals 62, respectively disposed in complementary grooves in the outer surface of the piston 60, for sealing engagement with the inner surface of the housing 40. A seal 63 is also provided in the bore 59 for sliding sealing engagement with the rod 55. The pistons 50 and 60 cooperate with the housing 40 to define therebetween a chamber 64 in which is disposed a helical compression spring 65 which bears against the pistons 50 and 60. The port 45 communicates with the chamber 64.

There is also provided a control assembly, generally designated by the numeral 70, which includes a generally cup-shaped coupler 71 disposed within the housing 40 and provided with an annular attachment flange 72 at its lower end for attachment to the upper surface of the piston 60, as by screws 73. The coupler 71 is provided with a cylindrical cavity 74 in its lower end which accommodates the nut 61. Fixedly secured to the upper end of the coupler 71 is an elongated threaded stem 75 which extends upwardly coaxially with the housing 40. More specifically, the stem 75 may be threadedly engaged in a recess 76 in the top of the coupler 71, being locked in place by a nut 77, it being understood that alternate attachment means could be used if desired.

The stem 75 is threadedly engaged with a cylindrical stem nut, provided at its lower end with an annular flange 81. The stem nut 80 extends through a complementary aperture 82 in a flat circular cover plate 83 which is secured to the attachment flange 44, as by bolts 84, to close the upper end of the housing 40, the flange 81 bearing against the inner surface of the cover plate 83. Fixedly secured to the stem nut 80 adjacent to the upper end thereof is a handwheel 85 to facilitate manual rotation of the stem nut 80. Threadedly engaged with the stem 75 at its upper end, above the stem nut 80, are a nut 87 and a jam nut 88. The stem nut 80 is provided at its upper end with an annular bearing plate 89. It will be seen that the vent port 47 communicates with the interior of the housing 40 between the piston 60 and the cover plate 83.

In operation, the control assembly 70 serves to hold the compression piston 60 in position in the housing 40 so as to provide a secure base against which the compression spring 65 is seated. Thus, the compression spring 65 resiliently urges the accumulator piston 50 to a fully extended position, illustrated in FIG. 2, in firm seating engagement with the seat 38. In this configuration, the chamber 52 will have its minimum volume.

In normal operation, the forward flow of feedwater through the passage 25 holds the valve disk 30 in its open condition, illustrated in FIG. 2. In this normal mode of operation, the internal pressure in the conduit 19, established by the pump 18, is typically about 1,300 psi. This normal pressure is exerted on the accumulator piston 50, and tends to urge it upwardly in the housing 40. However, the compression spring 65 is designed so that this normal operating pressure is insufficient to overcome the bias of the spring 65, so that the accumulator piston 50 remains seated in the position illustrated in FIG. 2.

In the event of a break of the conduit 19, between the pump 18 and the check valve 20, there will be a sharp drop in pressure on the inlet side of the check valve 20. The pump 18 will trip, and the still-pressurized steam generator 12 establishes a reverse pressure differential across the check valve 20 which tends to establish a reverse flow of the feedwater through the check valve 20, as indicated by the arrows in FIG. 3. This reverse flow moves the valve disk 30 toward its closed condition. As the valve disk 30 approaches its closed condition, the pressure in the outlet cavity 27 of the check valve 20 will rise above the predetermined bias force exerted by the spring 65 and, accordingly, the accumulator piston 50 will begin to rise against the urging of the spring 65, as indicated in FIG. 3. When the valve disk 30 slams completely shut in its closed condition against the seat 36, the pressure surge in the outlet cavity 27 peaks, and the accumulator piston 50 is raised still further, to a retracted position illustrated in FIG. 4. The cavity 74 in the coupler 71 has a depth sufficient to accommodate this retracting movement of the piston 50.

The upward movement of the accumulator piston 50 exposes the lower portion of the housing 40 to communication with the chamber 52 in the piston 50 and with the outlet cavity 27 of the check valve 20, thereby effectively increasing the volume of each. This increase in volume results in a corresponding decrease in pressure in the outlet cavity 27, thereby effectively suppressing the pressure surge created by the rapid closure of the valve disk 30 and effectively eliminating any "water hammer" effect. In this regard, it will be appreciated that since water is a substantially incompressible material, a very slight increase in the volume of the outlet cavity 27 is sufficient to dissipate an enormous pressure increase. After the steam generator 12 and the associated conduits have returned to equilibrium, the accumulator piston 50 returns to its normal extended position under the urging of the compression spring 65, as indicated in FIG. 5.

It is a significant aspect of the present invention that the control assembly 70 permits selective adjustment of the pre-loading on the compression spring 65 for adjusting the predetermined pressure at which the accumulator piston 50 will begin to rise. Thus, by manual rotation of the handwheel 85, the stem nut 80 will be rotated, thereby causing the stem 75 to travel axially, moving with it the coupler 71 and the compression piston 60. As the compression piston 60 is moved down, it increases the pre-loading on the spring 65, and as it is moved up it decreases that pre-loading. The nuts 87 and 88 serve to limit the downward movement of the stem 75, so as to prevent accidental driving of the compression piston 60 down to the point where it completely compresses the spring 65 or imparts a permanent set thereto. By appropriate adjustment of the position of the compression piston 60, the pressure necessary to lift the accumulator piston 50 can be adjusted from 1 or 2% of the normal line pressure to about 2-3 times the normal line pressure.

While the present invention is intended principally to eliminate the large pressure surges which result from the rapid closure of the check valve 20 in the event of a break in the associated conduit 19, it is significant that the invention is also useful in suppressing more moderate pressure surges which typically occur during normal operation of the nuclear steam generating plant 10. Thus, there are normal pressure oscillations which occur in the system as a result of the action of the pump 18 and other parts of the plant 10. The control assembly 70 can be set so that these normally-occurring pressure fluctuations can also be suppressed.

Another important aspect of the present invention is that the pistons 50 and 60 and the control assembly 70 are completely removable from the housing 40. Thus, by disconnection of the cover plate 83, the entire assembly can be lifted out by lifting on the handwheel 85. Thus, the stem nut 80 will pull up the cover plate 83, and the coupler 71 will pull up the compression piston 60, which will in turn engage the nut 61 to pull up the rod 55 and the accumulator piston 50. Thus, it can be seen that the entire assembly can be removed from the housing 40 in a single operation, without necessitating individual removal of the several parts.

The vent port 47 maintains atmospheric pressure in the housing 40 above the compression piston 60. This prevents pressure buildup or vacuum being formed above the compression piston 60 as it is moved up and down. The seals 54 effectively inhibit the passage of feedwater past the accumulator piston 50 and into the space between the pistons 50 and 60. Nevertheless, the port 45 is provided to remove any water which might infiltrate the housing 40 between the pistons 50 and 60, as by failure of the seals 54. This drain is essential since, because of the incompressibility of water, filling of the space between the pistons 50 and 60 would effectively prevent lifting of the accumulator piston 50.

While the check valve 20 has been described in connection with a nuclear plant application, it will be appreciated that the principles of the present invention could also be used in other types of applications. Similarly, while the check valve 20 has been disclosed as being of the pivoting disk type, other types of check valves constructions could be utilized. While a compression spring has been disclosed as the bias means for the accumulator piston 50, other types of compressible bias arrangements could be utilized, such as pneumatic or the like.

In a constructional model of the present invention, the body 21 and the housing 40, as well as the pistons 50 and 60 and the coupler 71 may be formed of a suitable metal, the gasket 39 may be a graphitic material, and the seals 54, 62 and 63 may be formed of rubber or other suitable flexible resilient material. But it will be appreciated that the present invention could be utilized in various sizes and types of check valves and that the particular materials used will depend upon the particular application. More specifically, the materials and dimensions of the check valve 20 will vary with the particular chemical composition of the liquid flowing through the valve 20 as well as the operating pressures and temperatures.

From the foregoing, it can be seen that there has been provided an improved check valve which is of relatively simple and economical construction and which effectively suppresses pressure surges while permitting rapid closure of the valve, and which provides adjustment means for the threshold actuating pressure and means for simple one-step disassembly of the valve.

I claim as my invention:

1. In a check valve including a body defining a fluid passage and valve means carried by the body for movement between an open condition opening the fluid passage and a closed condition closing the fluid passage and dividing it into inlet and outlet portions, the improvement comprising: a cylindrical housing coupled to said body and communicating with the outlet portion of the fluid passage, first piston means disposed in said housing and cooperating therewith to define a chamber communicating with the outlet portion of the fluid passage, said first piston means being movable axially of said housing between a normal extended position at the fluid passage for providing a minimum volume for said chamber and retracted positions spaced from the fluid passage for enlarging the volume of said chamber, second piston means disposed in said housing and spaced from said first piston means, bias means disposed between said first and second piston means and resiliently urging said first piston means to the extended position thereof, said first piston means being responsive to a predetermined pressure in the outlet portion of the fluid passage for moving to a retracted position against the urging of said bias means to enlarge the volume of said chamber and thereby effectively enlarge the volume of the outlet portion of the fluid passage for suppressing pressure surges therein, and control means coupled to said second piston means for adjusting the position thereof, thereby to adjust said predetermined pressure.

2. The check valve of claim 1, wherein said control means includes means for substantially immovably holding said second piston means in position within said housing.

3. The check valve of claim 2, wherein said holding means includes threaded means accommodating selectively controlled movement of said second piston means.

4. The check valve of claim 1, and further including withdrawal means coupled to said first and second piston means and to said bias means for effecting removal thereof from said housing.

5. The check valve of claim 4, wherein said withdrawal means includes means coupling said first and second means together.

6. The check valve of claim 5, wherein said coupling means includes an axial bore through said second piston means, stem means secured to said first piston means and extending axially through said bore, and retaining means fixedly secured to said stem means on the side of said second piston means opposite said first piston means and dimensioned to prevent passage thereof through said bore.

7. The check valve of claim 1, wherein each of said first and second piston means includes seal means effectively preventing the passage of fluid past said first and second seal means.

8. The check valve of claim 7, and further including port means for permitting removal of fluid from said housing on either side of said second piston means.

9. The check valve of claim 1, and further including seat means on the body engageable with said first piston means in the extended position thereof for limiting the movement of said first piston means under the urging of said bias means.

10. The check valve of claim 1, wherein said bias means comprises a helical compression spring.

* * * * *